(12) United States Patent
Gammon

(10) Patent No.: US 6,694,819 B1
(45) Date of Patent: Feb. 24, 2004

(54) PRESSURE GAUGE WITH AUTOMATICALLY OPERATED PRESSURE RELIEF VALVE

(75) Inventor: Howard M. Gammon, Sea Gert, NJ (US)

(73) Assignee: Gammon Technical Products, Inc., Manasquan, NJ (US)

( * ) Notice: Subject to any disclaimer, the term of this patent is extended or adjusted under 35 U.S.C. 154(b) by 688 days.

(21) Appl. No.: 10/402,236

(22) Filed: Nov. 13, 2000

Related U.S. Application Data

(63) Continuation of application No. PCT/US00/10296, filed on Apr. 17, 2000.
(60) Provisional application No. 60/130,895, filed on Apr. 23, 1999.

(51) Int. Cl.[7] .................................................. G01L 7/16
(52) U.S. Cl. ......................................................... 73/744
(58) Field of Search .......................... 73/744, 745, 746; 340/611; 137/106

(56) References Cited

U.S. PATENT DOCUMENTS 3,934,238 A * 1/1976 Pavlou ........................ 340/611
3,977,424 A * 8/1976 Patton ......................... 137/106

* cited by examiner

*Primary Examiner*—William Oen
(74) *Attorney, Agent, or Firm*—MacMillan, Sobanski & Todd; Donald R. Fraser

(57) ABSTRACT

A pressure gauge having a pressure operated piston for measuring the difference in pressure between two pressure signals including an automatically operative pressure relief valve and a manually operable three-way valve to provide a venting function useful for inspecting the operation of the pressure operated piston of the pressure gauge.

18 Claims, 2 Drawing Sheets

PRESSURE GAUGE WITH AUTOMATICALLY OPERATED PRESSURE RELIEF VALVE

This is a continuation of PCT/US00/10296 filed Apr. 17, 2000 and claims priority of provisional patent application Serial No. 60/130,895, filed Apr. 23, 1999.

FIELD OF THE INVENTION

The present invention relates to a pressure gauge and more particularly to a gauge for measuring the difference in pressure between two pressure signals and an associated pressure relieving feature.

BACKGROUND OF THE INVENTION

Differential pressure can be determined in many ways. One of the simplest methods of determining differential pressure is to measure or observe the motion of a close fitting piston balanced by a spring in a cylinder. A higher pressure is applied to the end of the cylinder not in communication with the spring and a lower pressure is applied to the end of the cylinder in communication with the spring. Accordingly, the higher pressure will cause the piston to move. The spring will be caused to compress until the force required to compress the spring added to the force caused by the lower pressure equals the force caused by the higher pressure. The distance that the piston travels can be measured and when carefully calibrated in terms of pressure differential will provide a reading of the difference between the high and low pressures.

Differential pressure gauges of the spring-balanced piston type are subject to erratic operation due to the disposition and collection of contamination in the clearance space between the piston and the associated cylinder. Typically, the clearance of the piston and the cylinder is very small (approximately 0.0003 inches) so that there is very little fluid flow possible. No seal is used because it would create friction thereby decreasing the accuracy of the gauge.

A test for possible contamination in a gauge that has a cylinder made of glass is commonly performed. The test is typically achieved by closing the low pressure connection and then venting the cavity beneath the piston so that the high pressure on top of the piston will drive the piston over its full length of travel. The operator observes the piston motion to detect erratic movement which would be indicative of binding caused by contaminating deposits. To provide for this test, it has been customary to use a 3-way selector valve located at the port where the low pressure connection is made.

Another issue which must be considered in the operation of equipment that is subject to pressure is to provide for protection against excessive pressure by utilizing a pressure relief valve. A common application for a pressure relief valve is on a filter vessel in a pipeline system. If the pipeline valves are closed in a way to isolate the filter vessel, solar heating causes an increase in temperature of the fluid in the vessel resulting from thermal expansion of the fluid which is far greater than the expansion of the materials used to make the vessel. The pressure relief valve releases enough fluid to prevent a pressure that is greater than the design pressure of the vessel.

If a differential pressure gauge is installed on the vessel, it is protected from excessive pressure by the pressure relief valve on the vessel. However, if isolation valves are closed which are installed in the tubing connecting the differential pressure gauge to the vessel, the excessive pressure in the gauge cannot be relieved. The gauge will break if the pressure exceeds the design pressure parameters of the gauge. To avoid this problem, a separate pressure relief valve can be installed on the gauge at considerable cost.

It is an object of the invention to produce a gauge for measuring a pressure differential between two pressure signals including an automatically operative pressure relief valve.

Another object of the invention is to produce a gauge for measuring a pressure differential between two pressure signals including a manually operable spring return push button to provide a venting function useful for inspecting the operation of the pressure operated piston of the gauge.

SUMMARY OF THE INVENTION

The above, as well as other objects of the invention, may be readily achieved by a differential pressure gauge having an automatically operative pressure relief valve and a manually operable three-way valve to provide a venting function useful for inspecting the operation of the pressure operated piston of the pressure gauge.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE ILLUSTRATED EMBODIMENT

Figure 1:
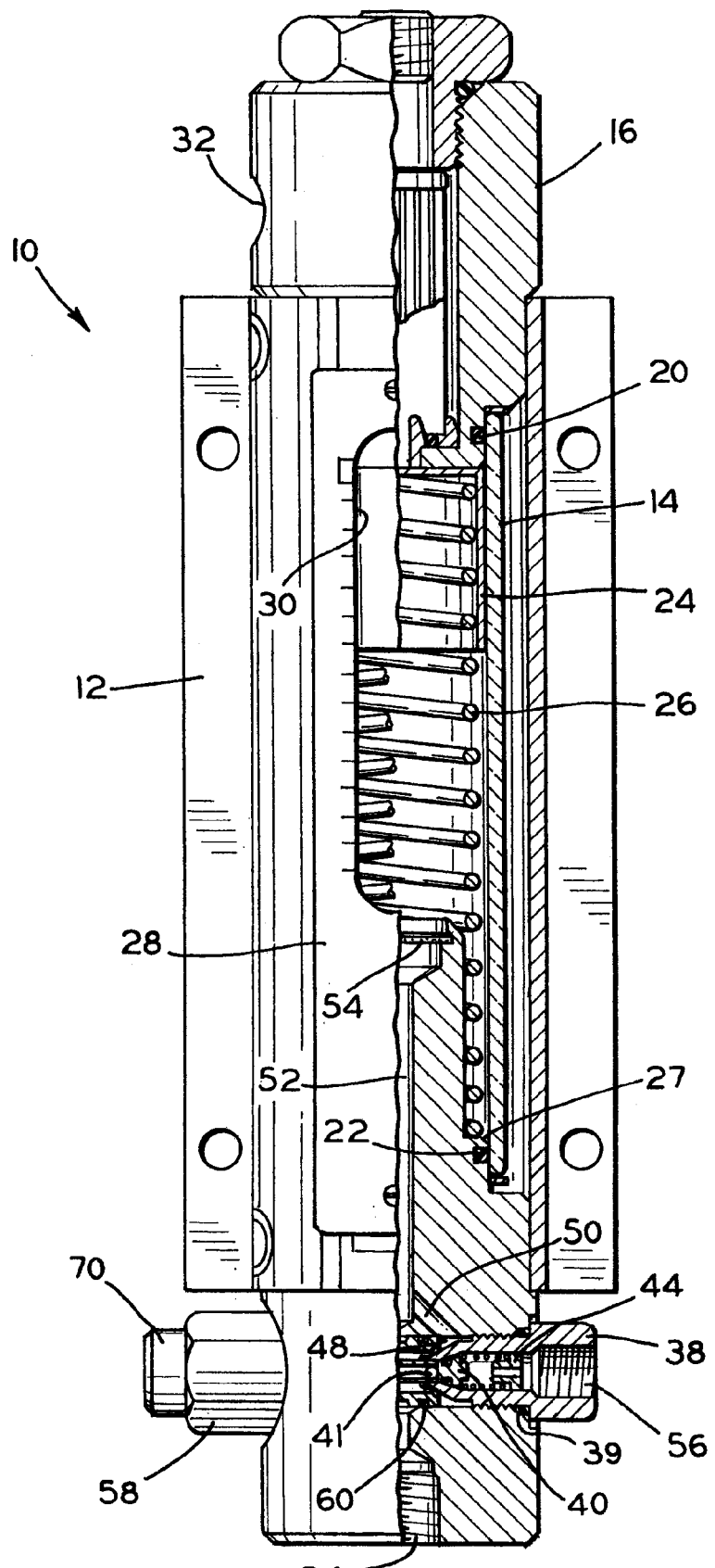
FIG. 1 is an elevational view partially in section showing a differential pressure gauge including a pressure relieving valve incorporating the features of the invention.

Referring now to the drawings, and particularly FIG. 1, there is shown generally at 10 a differential pressure gauge incorporating the features of the invention. The pressure gauge 10 includes a main housing or cage 12.

A translucent glass cylinder 14 is disposed within the cage 12. The ends of the glass cylinder 14 are sealed to an upper flange 16 and a lower flange 18 with O-rings 20, 22, respectively. The upper flange 16 and the lower flange 18 are removably mounted to the cage 12.

A piston 24 is slidably operable within the glass cylinder 14. The piston 24 strictly conforms to the shape of the glass cylinder 14 to maintain a close tolerance. Typically, the clearance between the outer wall of the piston 24 and the inner wall of the cylinder 14 is approximately 0.0003 inches or less. The piston 24 is urged by and supported within the glass cylinder 14 by a helical spring 26. One end of the spring 26 abuts a lip 27 on the flange 18. The opposite end of the spring 26 abuts an inner surface of the piston 24.

A nameplate 28 is disposed on the cage 12. A window 30 formed in the nameplate 28 facilitates viewing of the position of the piston 24 within the glass cylinder 14. The position of the top of the piston 24 is visually observed relative to a graduated scale on the nameplate 30 to read the differential pressure.

A high-pressure inlet 32 is in fluid communication with the end of the glass cylinder 14 towards which the piston 24 is being urged by the spring 26. The high-pressure inlet 32 is adapted to be placed in fluid communication with a high-pressure source (not shown).

A low-pressure inlet 34 is in fluid communication with the opposite end of the glass cylinder 14 as the high-pressure inlet 32. The low-pressure inlet 34 is adapted to be placed in fluid communication with a low-pressure source (not shown).

Figure 2:
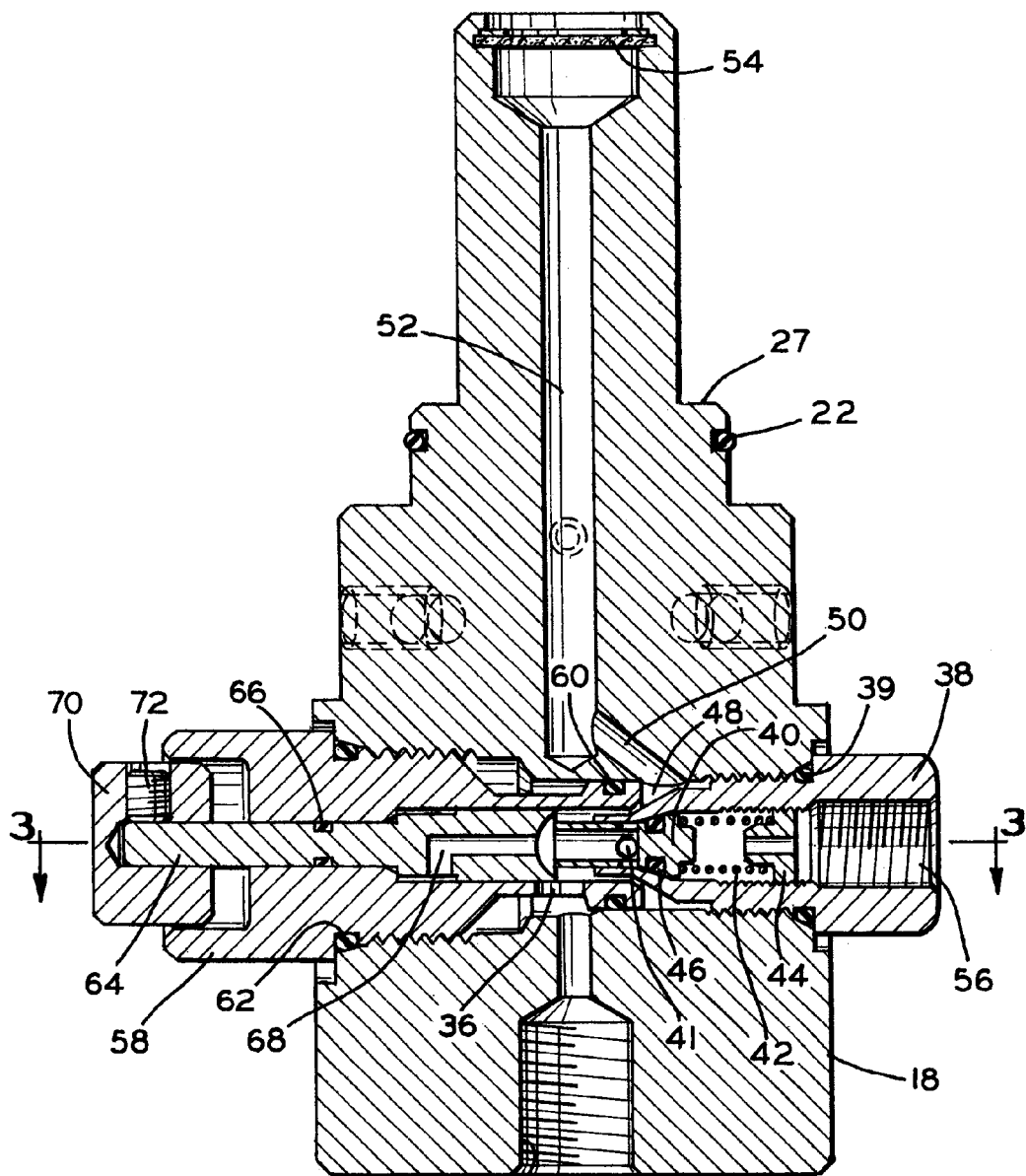
FIG. 2 is an enlarged sectional view of the pressure relief valve illustrated in FIG. 1.

Referring now to FIG. 2, there is shown an automatically operating pressure relief valve. The pressure relief valve is disposed in the pressure gauge 10 adjacent the low pressure inlet 34, as illustrated in FIG. 1. The pressure relief valve includes an inlet port 36. The inlet port 36 is in fluid communication with the low-pressure inlet 34.

A hollow fitting 38 is disposed in the flange 18. An O-ring 39 seals the outer surface of the hollow fitting 38 with the flange 18. A valve member 40 is slidably disposed within the interior portion of the hollow fitting 38. A hole 41 is formed to extend transversely through the valve 40. One end of a helical spring 42 abuts the valve 40. The other end of the spring 42 abuts an adjusting screw 44. The spring 42 urges the valve 40 to seat against an O-ring 46 thereby sealing the valve 40 with the hollow fitting 38.

A clearance or chamber 48 surrounds a portion of the outer wall of the hollow fitting 38 and is in fluid communication with the inlet port 36. A lateral passageway 50 leads from the chamber 48 to a main passageway 52. The lateral passageway 50 and the main passageway 52 permit fluid communication between the chamber 48 and the glass cylinder 14. A strainer 54 is disposed in an enlarged portion of the main passageway 52 adjacent the glass cylinder 14. A vent port 56 is disposed in the end of the hollow fitting 38 to provide fluid communication between the hollow portion of the hollow fitting 38 and a reservoir (not shown) or the atmosphere surrounding the pressure gauge, as desired.

The pressure relief valve structure is combined with additional structure to form a manually operable three-way valve to provide a venting function. A hollow insert 58 is disposed in the flange 18 opposite the hollow fitting 38. Spaced apart O-rings 60, 62 seal the hollow insert 58 with the flange 18.

A shaft 64 is slidably disposed in the hollow portion of the hollow insert 58. An O-ring 66 seals the shaft 64 with the hollow insert 58. A channel 68 is disposed in one end of the shaft 64. A push button 70 is disposed on the shaft 64 at the opposite end thereof from the channel 68. The push button 70 is insertable into an enlarged portion of the hollow insert 58 and extractable therefrom. A depressible normally outwardly urged protuberance 72 is disposed in and extends from the push button 70.

In normal operation, the lower pressure fluid reaches the cylinder cavity under the piston from low-pressure inlet 34 and passes through the inlet port 36 into the chamber 48. The fluid then enters the lateral passageway 50 and the main passageway 52 before passing through the strainer 54.

Figure 3:
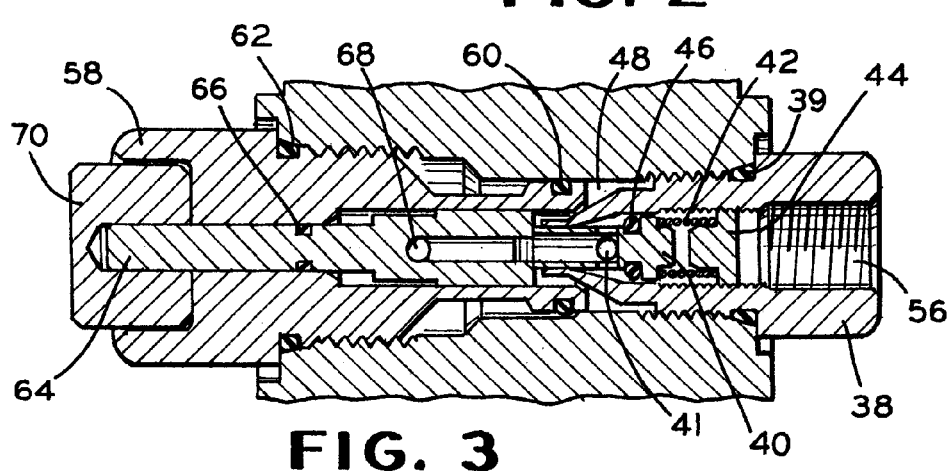
FIG. 3 is a fragmentary sectional view of the pressure relief valve illustrated in FIG. 2 taken along line 3—3 thereof showing the manually operable three-way valve in the depressed position.

When the push button 70 is pushed inwardly, it is caused to be urged against the end of the valve 40 which, in turn, is restrained by the spring 42, as illustrated in FIG. 3. The adjusting screw 44 can be moved inwardly or outwardly to create the desired restraining force. As the shaft 64 is moved across the inlet port 36, incoming fluid is cut off and continuing motion unseats the O-ring 46 of the valve 40. The unseating of valve 40 allows the fluid that is under the piston to be forced through the main passageway 52 and the lateral passageway 50 and into the chamber 48. The fluid can then flow through the hole 41 in the valve 40 and pass out of the gauge assembly through the vent port 56. The fluid is either discharged through the vent port 56 to the atmosphere or piped away to a reservoir. When the push button 70 is released, flow of low-pressure fluid from the low-pressure inlet 34 can then refill the cavity under the piston.

Under a condition of excessive pressure build-up inside of the gauge, caused by thermal expansion of the liquid, the resulting pressure acts on the valve 40 to compress the spring 42 and permit the high pressure fluid to exit through the vent port 56. The depressible protuberance 72 prevents the push button 70 from accidentally being depressed.

As described, the valve 40 performs two functions. First, the valve operates as an automatic pressure relief valve. Second, the valve operates as a manual 3-way valve that can be activated to perform the venting function that is used to inspect the operation of the piston. Therefore, a benefit of the invention is the replacement of a 3-way selector valve with a 3-way valve that consists of a spring return push button that performs the same function which also functions as a pressure relief valve.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A differential pressure gauge for measuring a pressure differential between two pressure signals comprising:
   a main housing;
   a high-pressure inlet in said main housing providing fluid communication with a high-pressure source;
   a low-pressure inlet in said main housing providing fluid communication with a low-pressure source;
   a translucent hollow cylinder having two ends, the first end of said cylinder in fluid communication with said high-pressure inlet and the second end of said cylinder in fluid communication with said low-pressure inlet;
   a piston slidably disposed within said cylinder;
   a spring disposed within said cylinder, said spring urging said piston towards the first end of said cylinder; and
   a pressure relief valve disposed in said main housing having a manually operable three-way valve to provide a venting function useful for inspecting the sliding operation of said piston, wherein said pressure relief valve is in fluid communication with said low-pressure inlet and said cylinder.

2. The differential pressure gauge according to claim 1, including a nameplate having a window formed therein, whereby said cylinder is viewable through the window.

3. The differential pressure gauge according to claim 1, including a push button to operate the three-way valve.

4. The differential pressure gauge according to claim 1, wherein the clearance between said piston and said cylinder is less than 0.0003 inches.

5. The differential pressure gauge according to claim 1, wherein said pressure relief valve comprises:
   a hollow fitting;
   a valve slidably disposed within said hollow fitting;
   an adjusting screw disposed within said hollow fitting spaced apart from said valve;
   a spring disposed between said valve and said adjusting screw, wherein said spring urges said valve away from said adjusting screw.

6. The differential pressure gauge according to claim 5, wherein said adjusting screw is positionable to adjust the force exerted by said spring on said valve.

7. The differential pressure gauge according to claim 6, wherein said valve has a hole formed therein.

8. The differential pressure gauge according to claim 7, wherein said pressure relief valve further comprises:
   a hollow insert disposed adjacent said hollow fitting;
   a shaft slidably disposed in said hollow insert; and
   a push button disposed on one end of said shaft, whereby depressing said push button causes said shaft to contact said valve and compress said spring.

9. The differential pressure gauge according to claim 8, wherein said push button includes a depressible protuberance extending therefrom.

10. A differential pressure gauge for measuring a pressure differential between two pressure signals comprising:
    a main housing;
    an upper flange disposed on said main housing having a high-pressure inlet disposed therein, the high-pressure inlet providing fluid communication with a high-pressure source;
    a lower flange disposed on said main housing opposing said upper flange, said lower flange having a low-pressure inlet disposed therein, the low-pressure inlet providing fluid communication with a low-pressure source;
    a translucent hollow cylinder having two ends, the first end of said cylinder sealed to said upper flange of said main housing and in fluid communication with the high-pressure inlet, the second end of said cylinder sealed to said lower flange of said main housing and in fluid communication with the low-pressure inlet;
    a pressure operated piston slidably disposed within said cylinder;
    a spring disposed within said cylinder, said spring urging said piston towards the first end of said cylinder; and
    a pressure relief valve disposed in said main housing having a manually operable three-way valve to provide a venting function useful for inspecting the sliding operation of said pressure operated piston, wherein said pressure relief valve is in fluid communication with the low-pressure inlet and said cylinder.

11. The differential pressure gauge according to claim 10, including a nameplate having a window formed therein, whereby said cylinder is viewable through the window.

12. The differential pressure gauge according to claim 10, including a push button to operate the three-way valve.

13. The differential pressure gauge according to claim 10, wherein the clearance between said piston and said cylinder is less than 0.0003 inches.

14. The differential pressure gauge according to claim 10, wherein said pressure relief valve comprises:
    a hollow fitting;
    a valve slidably disposed within said hollow fitting;
    an adjusting screw disposed within said hollow fitting spaced apart from said valve;
    a spring disposed between said valve and said adjusting screw, wherein said spring urges said valve away from said adjusting screw.

15. The differential pressure gauge according to claim 14, wherein said adjusting screw is positionable to adjust the force exerted by said spring on said valve.

16. The differential pressure gauge according to claim 15, wherein said valve has a hole formed therein.

17. The differential pressure gauge according to claim 16, wherein said pressure relief valve further comprises:
    a hollow insert disposed adjacent said hollow fitting;
    a shaft slidably disposed in said hollow insert; and
    a push button disposed on one end of said shaft, whereby depressing said push button causes said shaft to contact said valve and compress said spring.

18. The differential pressure gauge according to claim 17, wherein said push button includes a depressible protuberance extending therefrom.

* * * * *